United States Patent [19]

Heidjann

[11] Patent Number: 5,190,497
[45] Date of Patent: Mar. 2, 1993

[54] SELF-PROPELLING HARVESTER THRESHER

[75] Inventor: Franz Heidjann, Harsewinkel, Fed. Rep. of Germany

[73] Assignee: Claas Ohg, Harsewinkel, Fed. Rep. of Germany

[21] Appl. No.: 728,599

[22] Filed: Jul. 11, 1991

[30] Foreign Application Priority Data

Jul. 26, 1990 [DE] Fed. Rep. of Germany ....... 4023720

[51] Int. Cl.⁵ .............................................. A01F 12/20
[52] U.S. Cl. ......................................... 460/76; 460/62
[58] Field of Search ....................... 460/76, 62, 63, 75, 460/88

[56] References Cited

U.S. PATENT DOCUMENTS

| | | | |
|---|---|---|---|
| 1,075,985 | 10/1913 | McCallum | 460/88 |
| 4,367,756 | 1/1983 | Roderfeld et al. | 460/62 |
| 4,425,925 | 1/1984 | Kersting et al. | 460/62 X |

FOREIGN PATENT DOCUMENTS 479781 4/1954 Italy ....................................... 460/76

*Primary Examiner*—Terry Lee Melius
*Attorney, Agent, or Firm*—Michael J. Striker

[57] ABSTRACT

A self-propelling harvester thresher has two threshing mechanisms located one after the other in a direction which is transverse to a transporting direction and each having a threshing drum and a threshing basket. The threshing mechanism operate in accordance with the principle of a tangential flow and both drums of the thresing mechanisms rotate in the same direction. The threshing basket and the threshing drum of the first threshing mechanism and the threshing basket and the threshing drum of the second threshing mechanism are arranged with a gap relative to one another which gap is adjustable. The threshing drum of one of the threshing mechanisms which is the first threshing mechanism as considered in a working direction has a circumferential speed which is smaller than the circumferential speed of threshing drum of the other of the threshing mechanisms which is a second threshing mechanism as considered in the working direction.

15 Claims, 3 Drawing Sheets

SELF-PROPELLING HARVESTER THRESHER

BACKGROUND OF THE INVENTION

The present invention relates to a self-propelling harvester thresher.

More particularly it relates to such a harvester thresher which has two threshing mechanisms located one after the other in a direction which is transverse to a transporting direction.

Harvester threshers of the above mentioned general type are known in the art. In a known harvester thresher each threshing mechanism has a threshing drum and a threshing basket, the threshing mechanisms operate in accordance with the principle of a tangential flow and both troughs of the threshing mechanisms rotate in the same direction. From these two threshing mechanisms, the first threshing mechanism in addition to the function of operating a threshing unit also has the function to make the harvested product uniform, for example the product which usually is supplied by an inclined conveyor in not always uniform quantity Therefore the product stream which varies within narrow limits can be processed by the second threshing mechanism, and the threshing out is substantially improved. The disadvantage of this construction is however that the adjustment of both threshing mechanisms to different types of the harvested products and ground conditions is given too little importance.

SUMMARY OF THE INVENTION

Accordingly, it is an object of the present invention to provide a harvester thresher of the above mentioned general type, which avoids the disadvantages of the prior art and is a further improvement of existing machines.

More particularly, it is an object of the present invention to provide a harvester thresher of the above mentioned type, which is designed so that adjustments of both threshing mechanisms to different criteria of application of the harvester thresher can be performed in a satisfactory manner.

In keeping with these objects and with others which will become apparent hereinafter, one feature of the present invention resides, briefly stated, in a harvester thresher in which the gap between the threshing basket in the threshing drum of the first threshing mechanism and also the gap between the threshing basket and the threshing drum of the second threshing mechanism are adjustable, and the circumferential speed of the drum of the first threshing mechanism as considered in the working direction is smaller than the circumferential speed of the drum of the second mechanism.

When the harvester thresher is designed in accordance with the present invention it avoids the disadvantages of the prior art and provides for highly advantageous results.

In accordance with another feature of the present invention, both threshing baskets of the threshing mechanisms are adjustable.

For this purpose, in accordance with still another feature of the present invention it is possible that the ends of the threshing baskets which face away from one another are adjusted separately while the ends of the threshing baskets which face toward one another are adjusted jointly.

Still another feature of the present invention is that the ends of the threshing baskets which face toward one another are supported on a joint vertically adjustable axle.

At least one end of the axle can be connected with a pulling element which is arrestable in several different positions.

The ends of the threshing baskets which face away from one another can be adjustable by adjusting screws which are connected with holders mounted on the frame of the harvester thresher.

The threshing drum of at least the first threshing mechanism can be formed as a completely cylindrical body with exchangeable drivers.

In accordance with still another feature of the present invention, the rotary speed of the threshing drum of the first threshing mechanism as considered in a working direction is smaller than the rotary speed of the threshing drum of the second threshing mechanism.

The threshing basket of the first threshing mechanism can be provided with exchangeable segments.

Finally, the threshing drums of both threshing mechanism can have identical diameters and can be interchangeably supported in the housing of the harvester thresher.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
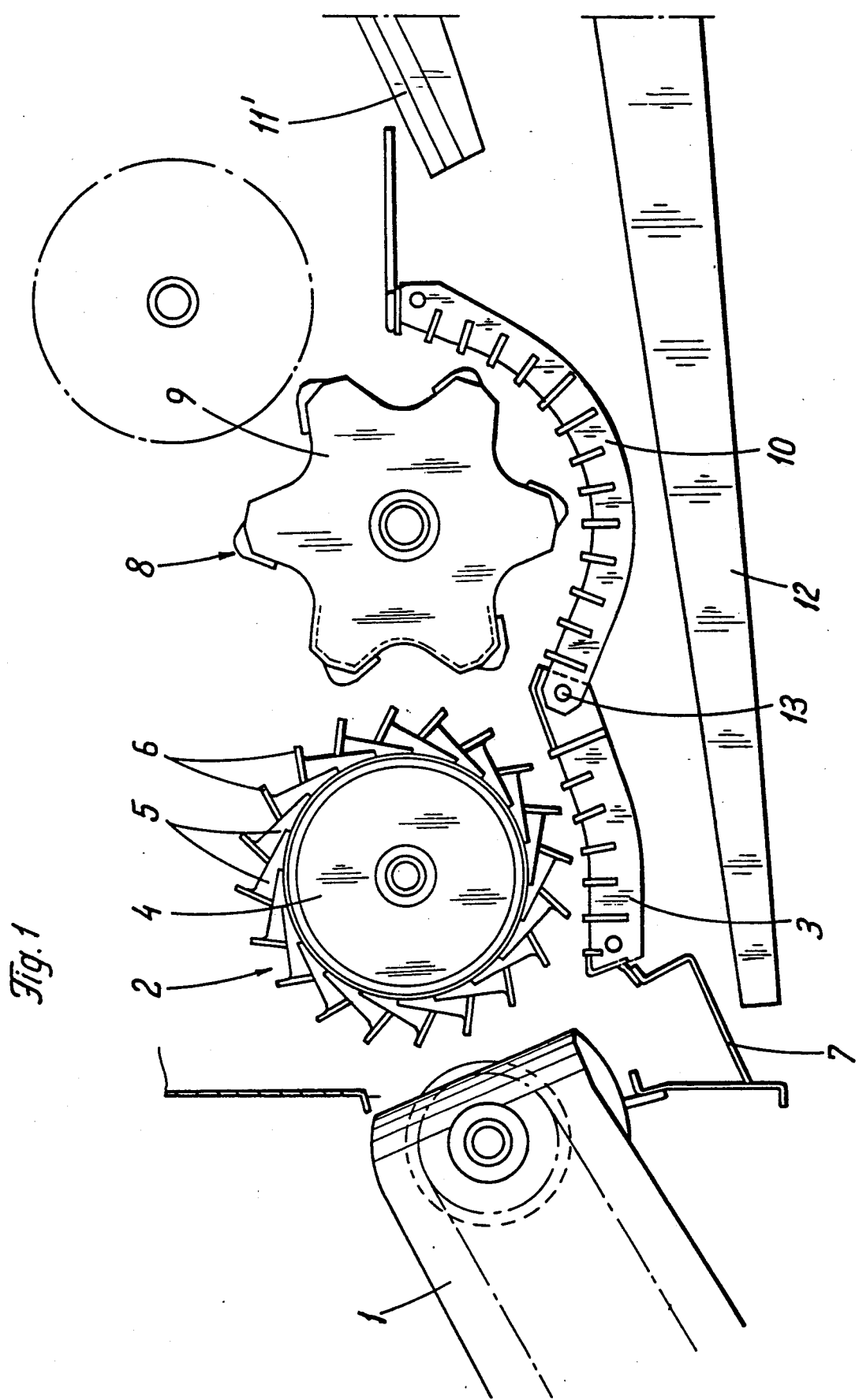
FIG. 1 is a side view of a harvester thresher in accordance with the present invention.

As schematically shown a self-propelling harvester thresher has an inclined conveyor which is identified with reference numeral 1. The inclined conveyor 1 supplies a harvested product to a first threshing mechanism 2. The threshing mechanism 2 includes a threshing basket 3 and a threshing drum 4. The threshing drum 4 is formed as a completely cylindrical body with a plurality of holders 5. The holders 5 are welded on the body and arranged in an offset manner relative to one another. Different drivers 6 can be connected with the holders 5 depending on the type of the product to be harvested. The connection can be performed for example by a screw means.

Rocks and the like which are eventually entrained in the harvested product and supplied by the inclined conveyor 1 are separated in a first rock catching trough 7 to prevent damages to the threshing mechanism 2. The rock catching trough 7 is located before the first threshing mechanism 2. The product stream which is partially threshed by the first threshing mechanism and is uniform with respect to the product supply, flows to a second threshing mechanism 8 which immediately follows the first threshing mechanism. The second threshing mechanism 8 similarly to the first threshing mechanism 2 operates in accordance with the tangential flow system and includes a threshing drum 9 and a threshing basket 10.

The threshing drum 9 also has a closed periphery as the threshing drum 4. The threshing mechanism 8 performs the complete threshing out of the harvested product.

The product mat which exits the second threshing mechanism 8 and is loaded with residual grains is supplied to a post separating device 11'. In the present case the post separating device is formed as a shaking tray. It can also be formed as a rotatable device operating in accordance with the centrifugal principle. The operation of the post separating device 11' as well as a transporting device 12 which is associated with the baskets 3 and 10 can be not explained in detail, since it is well known from harvester threshers of known types.

Figure 2:
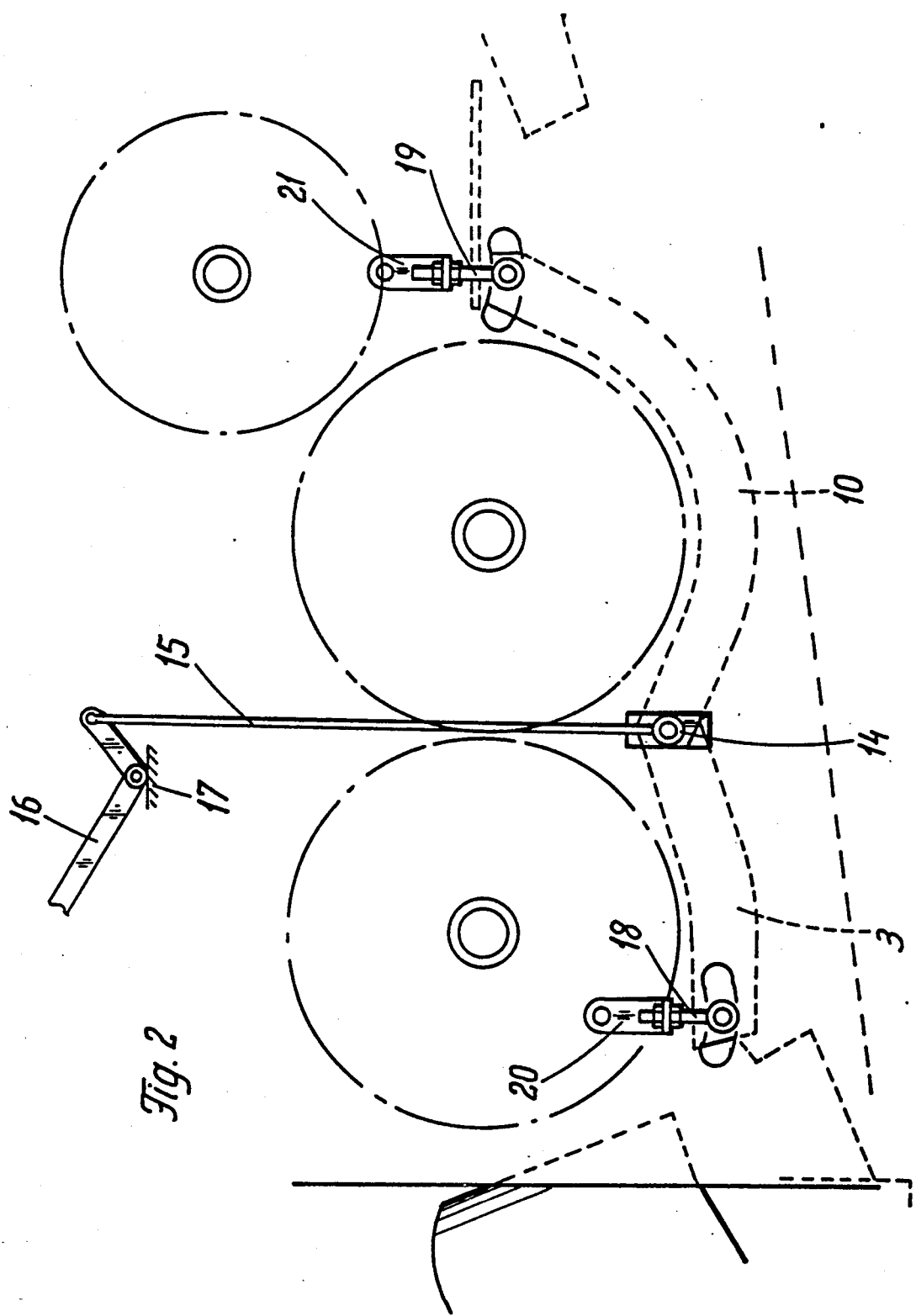
FIG. 2 is a view showing a part of the inventive harvester thresher of FIG. 1 in the area of the threshing mechanisms to illustrate the adjustment of threshing baskets of the threshing mechanisms.
Figure 3:
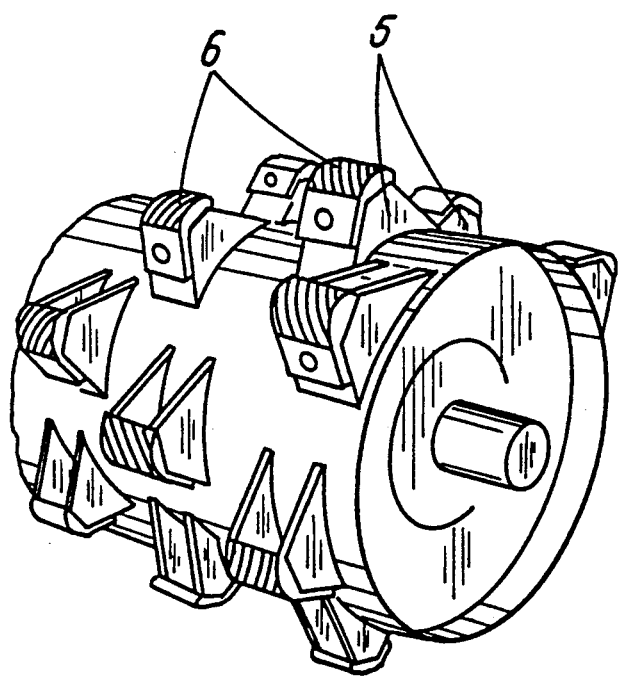
FIG. 3 is a view showing a part of a first threshing mechanism of the inventive harvester thresher, in perspective.

As can be seen from FIG. 2, both threshing baskets 3 and 9 are held at their proximal ends by a common axle 13. The axle 13 is supported at its both ends in lugs 15 of pulling rods 15. The pulling rods 15 at their ends which face away of the lugs 14 are articulately connected with adjusting levers 16. The adjusting levers are displaceably supported in concoles 17 and can be arrested in each position by arresting means not shown in the drawings. Thereby the axle 13 can be vertically adjusted or displaced. As a result, the outlet gap between the threshing basket 3 and the threshing drum 4 of the first threshing mechanism can be adjusted simultaneously with the adjustment of the inlet gap between the threshing basket 10 and the threshing drum 9.

The ends of the threshing baskets 3 and 10 which face away from one another are supported by adjusting screws 18 and 19. The adjusting screws are displaceably mounted on holders 20 and 21 which are fixedly connected with the not shown frame of the harvester thresher. This means that the inlet gap of the first threshing mechanism 2 and the outlet gap of the second threshing mechanism 8 are adjustable individually.

The drum 4 of the first threshing mechanism 2 has a circumferential speed which is smaller than the circumferential speed of the drum 9 of the second threshing mechanism 8. The rotary speed of the drum 4 of the first threshing mechanism is smaller than the rotary speed of the drum 9 of the second threshing mechanism. The segments provided on the threshing basket 3 of the first threshing mechanism 2 are exchangeable. The threshing drums 4 and 9 of the threshing mechanisms 2 and 8 have the same diameter and are supported interchangeably with one another in the housing of the harvester thresher.

It will be understood that each of the elements described above, or two or more together, may also find a useful application in other types of constructions differing from the types described above.

While the invention has been illustrated and described as embodied in a self-propelling harvester thresher, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A self-propelling harvester thresher, comprising two threshing mechanisms located one after the other in a direction which is transverse to a transporting direction and each having a threshing drum and a threshing basket, said threshing mechanisms operating in accordance with the principle of a tangential flow and both drums of the threshing mechanisms rotating in the same direction, said threshing basket and said threshing drum of said first threshing mechanism and said threshing basket and said threshing drum of said second threshing mechanism being arranged with a gap relative to one another which gap is adjustable, said threshing drum of one of said threshing mechanisms which is the first threshing mechanism as considered in a working direction having a circumferential speed which is smaller than a circumferential speed of said threshing drum of the other of said threshing mechanisms which in a second threshing mechanism as considered in the working direction.

2. A self-propelling harvester thresher as defined in claim 1; and further comprising means for adjusting said gap between said threshing basket and said threshing drum of each of said threshing mechanisms.

3. A self-propelling harvester thresher as defined in claim 1, wherein both said threshing baskets of said threshing mechanisms are adjustable.

4. A self-propelling harvester thresher as defined in claim 1, wherein said threshing baskets of said threshing mechanisms have ends which face away from one another and are separately adjustable; and further comprising means for separately adjusting said ends which face away from one another.

5. A self-propelling harvester thresher as defined in claim 1, wherein said threshing baskets of said threshing mechanisms have ends which face toward one another and are jointly adjustable; and further comprising means for jointly adjusting said ends which face toward one another.

6. A self-propelling harvester thresher as defined in claim 4, wherein said threshing baskets of said threshing mechanisms have ends which face toward one another and are jointly adjustable; and further comprising means for jointly adjusting said ends which face toward one another.

7. A self-propelling harvester thresher as defined in claim 1, wherein said threshing baskets of said threshing mechanisms have ends which face toward one another; and further comprising a vertically adjustable axle on which both said ends of said threshing baskets are jointly supported.

8. A self-propelling harvester thresher as defined in claim 7, wherein said axle has two ends; and further comprising a pulling element engaging at least one of said ends of said axle and being arrestable in different positions.

9. A self-propelling harvester thresher as defined in claim 1, wherein said threshing basket of said threshing mechanisms have ends which face away from one another and are adjustable; and further comprising means for adjusting said ends which face away from one another and including adjusting screws connected with said ends, and holders connected with said adjusting screws.

10. A self-propelling harvester thresher as defined in claim 9; and further comprising a harvester thresher frame, said holders being mounted on said frame.

11. A self-propelling harvester thresher as defined in claim 1, wherein said threshing drum of at least said first threshing mechanism is formed as a completely cylindrical body provided with exchangable drivers.

12. A self-propelling harvester thresher as defined in claim 1, wherein said threshing drum of said first threshing mechanism has a number of revolutions which is smaller than the number of revolutions of said threshing drum of said second threshing mechanism.

13. A self-propelling harvester thresher as defined in claim 1, wherein said threshing basket associated with said threshing drum of said first threshing mechanism is provided with exchangable segments.

14. A self-propelling harvester thresher as defined in claim 1, wherein said threshing drums of said threshing mechanisms have identical diameters.

15. A self-propelling harvester thresher as defined in claim 14; and further comprising a machine housing, said threshing drums being exchangably supported in said machine housing.

* * * * *